(12) United States Patent
Galewyrick et al.

(10) Patent No.: US 10,370,191 B2
(45) Date of Patent: Aug. 6, 2019

(54) MOVABLE PLATFORM WITH A MECHANICAL LIFT BRAKE ASSEMBLY

(71) Applicant: Innovative Logistics, Inc., Fort Smith, AR (US)

(72) Inventors: Seth Galewyrick, Fort Smith, AR (US); Patrick Sullivan, Fort Smith, AR (US); Mark Bradley, Fort Smith, AR (US)

(73) Assignee: INNOVATIVE LOGISTICS, INC., Fort Smith, AR (US)

( * ) Notice: Subject to any disclaimer, the term of this patent is extended or adjusted under 35 U.S.C. 154(b) by 0 days.

(21) Appl. No.: 15/902,421

(22) Filed: Feb. 22, 2018

(65) Prior Publication Data

US 2018/0237225 A1 Aug. 23, 2018

Related U.S. Application Data

(60) Provisional application No. 62/462,003, filed on Feb. 22, 2017.

(51) Int. Cl.
| | | |
|---|---|---|
| B65G 13/00 | (2006.01) | |
| B65G 13/075 | (2006.01) | |
| B65D 19/00 | (2006.01) | |
| B65D 19/42 | (2006.01) | |

(Continued)

(52) U.S. Cl.
CPC ....... B65G 13/075 (2013.01); B65D 19/0002 (2013.01); B65D 19/0004 (2013.01); B65D 19/42 (2013.01); B65D 88/129 (2013.01); B65D 90/12 (2013.01)

(58) Field of Classification Search
CPC ............ B65D 19/0016; B65D 19/0002; B62D 5/0433; B62D 3/006
See application file for complete search history.

(56) References Cited

U.S. PATENT DOCUMENTS

| | | | | |
|---|---|---|---|---|
| 4,073,369 A | * | 2/1978 | Nordskog | ................. B60T 1/14 188/32 |
| 4,886,286 A | * | 12/1989 | Whorton, III | .......... B62B 3/006 280/47.35 |
| 6,575,686 B2 | | 6/2003 | Hagenzieker | |

(Continued)

FOREIGN PATENT DOCUMENTS

| | | |
|---|---|---|
| CN | 102874510 A | 1/2013 |
| DE | 29518266 U1 | 7/1996 |

(Continued)

OTHER PUBLICATIONS

Notice of Allowance dated Jul. 19, 2018, from U.S. Appl. No. 15/799,194.

(Continued)

*Primary Examiner* — Hau V Phan
(74) *Attorney, Agent, or Firm* — Katten Muchin Rosenman LLP

(57) ABSTRACT

Disclosed herein is a movable platform (MP) for moving freight during cross-dock operations. The MP comprises a mechanical lift brake assembly that can be utilized to deploy a plurality of mechanical lift brakes preventing further movement of the MP. A MP forklift attachment that can be used to convey the MP and to engage or disengage the mechanical lift brake assembly. The MP forklift attachment can be attached to a conveyance vehicle, such as a forklift, or built into an automated guided vehicle.

15 Claims, 18 Drawing Sheets

(51) Int. Cl.
*B65D 90/12* (2006.01)
*B65D 88/12* (2006.01)

(56) References Cited

U.S. PATENT DOCUMENTS

| | | |
|---|---|---|
| 8,006,985 B2 | 8/2011 | Facey |
| 8,016,300 B2 | 9/2011 | Cramer |
| 8,292,309 B2 | 10/2012 | Fan |
| 8,888,110 B2 | 11/2014 | Sadeh |
| 9,045,253 B2 * | 6/2015 | Hacko .................. B62B 5/0433 |
| 9,950,726 B2 | 4/2018 | Thompson |
| 2002/0031418 A1 | 3/2002 | Hagenzieker |
| 2003/0050819 A1 | 3/2003 | Koenigbauer et al. |
| 2005/0002766 A1 | 1/2005 | Hartmann et al. |
| 2005/0071234 A1 | 3/2005 | Schon |
| 2007/0186827 A1 * | 8/2007 | Loftus ................ B65D 19/0016 |
| | | 108/57.15 |
| 2007/0279224 A1 | 12/2007 | Branigan et al. |
| 2010/0187782 A1 * | 7/2010 | Facey ....................... B60T 1/14 |
| | | 280/30 |
| 2013/0119623 A1 | 5/2013 | Sadeh et al. |
| 2016/0311453 A1 * | 10/2016 | Thompson ............. B60P 3/077 |

FOREIGN PATENT DOCUMENTS

| | | |
|---|---|---|
| FR | 891662 A | 3/1944 |
| JP | H07-69458 A | 3/1995 |
| KR | 20140101117 A | 8/2014 |
| WO | 2008/111041 A2 | 9/2008 |

OTHER PUBLICATIONS

International Search Report and Written Opinion dated May 30, 2018, from the corresponding International Application No. PCT/US2018/019178, 15 sheets.

Extended European search report dated Apr. 23, 2018, for European Patent Application No. 15870857.8, 6 sheets.

International Search Report and Written Opinion dated Jul. 13, 2018, from International Application No. PCT/US2017/059264, 15 sheets.

Notice of Allowance dated Jun. 28, 2018, from U.S. Appl. No. 15/799,194.

International Preliminary Report on Patentability dated Feb. 7, 2019, for International Application No. PCT/US2017/059264, 64 sheets.

Written Opinion of the International Preliminary Examining Authority dated Nov. 15, 2018, for International Application No. PCT/US2017/059264, 7 sheets.

\* cited by examiner

MOVABLE PLATFORM WITH A MECHANICAL LIFT BRAKE ASSEMBLY

CROSS-REFERENCE TO RELATED APPLICATIONS

This application claims priority to U.S. Provisional Patent Application Ser. No. 62/462,003, filed Feb. 22, 2017, the entire content of which is hereby incorporated by reference in its entirety.

FIELD OF THE INVENTION

The present invention provides a movable platform (MP) used to transfer freight in and out of a semi-trailer in one move. More particularly, the present invention provides a MP comprising a plurality of mechanical lift brake assemblies which can be deployed to prevent movement of the MP during transport.

RELATED APPLICATIONS

The present invention can be utilized in any standard or custom warehouse. Particularly, the MP of the present invention can be utilized with the systems and methods described in related U.S. Pat. No. 9,367,827, issued Jun. 14, 2016 and/or U.S. patent application Ser. No. 15/798,729, filed Oct. 31, 2017, the entire contents of which are hereby incorporated by reference in their entirety. Further, the MP of the present invention is compatible with the modular deck system disclosed in U.S. patent application Ser. No. 15/798,597, filed Oct. 31, 2017, the entire content of which is hereby incorporated by reference in its entirety.

BACKGROUND

The trucking industry, specifically the segment consisting of Full-Truckload (FTL) and Less-than-truckload (LTL), is a segment of the shipping industry that ships a wide array of freight. The shipment sizes can vary from an individual item consisting of one piece to a full truckload consisting of several pieces. FTL freight is typically handled only once as it is loaded into a semi-trailer at the shipper's location and unloaded at the consignee's location. In the LTL industry, freight is commonly handled multiple times, with the shipper loading the freight into a semi-trailer, then the freight is returned to a local freight terminal to be unloaded/loaded into a another trailer to be routed to the destination. This process, commonly known as a hub-and-spoke network, is used to increase the efficiency of the operation by increasing density.

The traditional method of loading freight into a semi-trailer is to back a semi-trailer to a raised dock and unload each piece/pallet using a forklift. A 53' semi-trailer van can hold up to 30 pallets on the floor of the trailer. To unload a loaded semi-trailer conventionally, it requires a single forklift driver to drive into the trailer to pick-up and remove each pallet. During this unloading process, a driver could take up to 30 trips into the trailer to remove each pallet. This process is typically completed utilizing one forklift driver but it is possible to utilize two forklift drivers to unload a trailer simultaneously.

As should be apparent, this process is wasteful in that the forklift is often not conveying cargo (empty carries). Also, because the trailer is not connected to the dock, the forklift driver must be careful each time that they enter the trailer. This further reduces the speed of the process. Therefore, there is clearly a need for a MP which can be easily unloaded from a trailer in a single move without the forklift driver having to enter the trailer. The MP should also have a mechanism for resisting movement during transport. As will be made apparent in the following disclosure, the present invention provides a solution for these aforementioned problems.

SUMMARY

The present invention provides a MP for moving freight during cross-dock operations. The MP comprises a mechanical lift brake assembly that can be utilized to deploy a plurality of mechanical lift brakes preventing further movement of the MP. Also disclosed is a MP forklift attachment that can be used to convey the MP and to engage or disengage the mechanical lift brake assembly. The MP forklift attachment can be attached to a conveyance vehicle, such as a forklift, or built in to an automated guided vehicle.

BRIEF DESCRIPTION OF THE DRAWINGS

These and other advantages of the present invention will be readily understood with the reference to the following specifications and attached drawings wherein.

DETAILED DESCRIPTION

Preferred embodiments of the present invention will be described herein below with reference to the accompanying drawings. In the following description, well-known functions or constructions are not described in detail because they may obscure the invention in unnecessary detail. While the present invention is generally directed to LTL operations for use in the trucking industry, the teachings may be applied to other shipping industries, just as those by air, sea, and rail. Therefore, the teachings should not be constructed as being limited to only the trucking industry.

Figure 1:
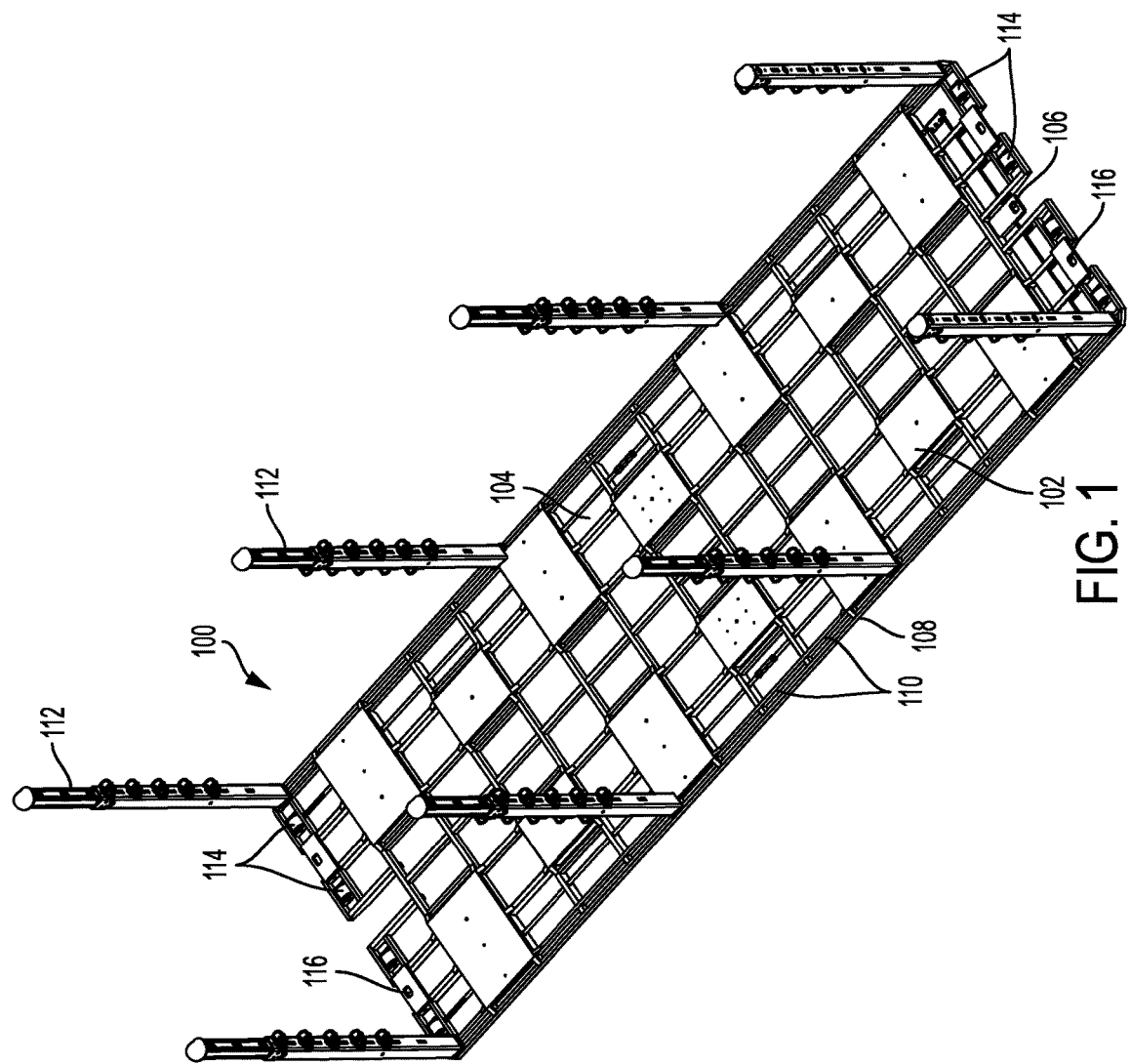
FIG. 1 depicts a perspective view of the MP according to the present invention.

Referring first to FIG. 1, depicted is a perspective view of MP 100 used to convey freight in and out of trailers. Generally, MP 100 comprises frame 102, decking 104, and mechanical lift brake assembly 106. MP 100 preferably has a height of 4" or less when resting on the ground and 5" or less when rollers are engaged to limit impact on load capacity in a trailer. MP 100 is designed to be loaded with up to 24,000 pounds of freight. MP 100 can be raised without the forklift operator getting off the forklift via an actuating attachment and vice versa. MP 100 is designed to be conveyed with a standard 4,000 pound capacity forklift to unload/load MP 100 in and out of a trailer. Other conveyance vehicles, such as automated guided vehicles (AGVs), can also be used to automatically convey the MP 100 during cross-dock operations.

Empty MPs 100 can be stacked up to 8 high in a pup trailer, allowing more economical shipping from the manufacturer or for repositioning of MPs 100 from one hub/spoke to another. Generally, MP 100 is 26' in length, allowing it to fit into a standard pup trailer which has an interior length of 27.5' or two into a van trailer which has an interior length of 52.5'. Preferably, the width of MP 100 can be modified to fit either a roll door trailer or a swing door trailer. It should be apparent to one of ordinary skill in the art that these dimensions can be modified to fit any global standard of trailer or for any custom trailer.

Frame 102 provides the structural support for MP 100. Frame 102 is mostly constructed from rectangular or square tubular segments which are welded together to form frame 102. Decking 104 is preferably a lightweight material, such as plywood or plastic, which prevents smaller freight from falling through frame 102 when MP 100 is in transport. The frame 102 and decking 104 are designed to allow a standard 4,000 lb. forklift to drive on MP 100 unload/load freight conventionally. It should be apparent that decking 104 may also be a metal mesh or other material if weight of MP 100 is a priority.

In some embodiments, frame 102 further comprises rub rail 108 located along the opposing lengthwise edges of frame 102. Each end of each rub rail 108 is chamfered at an angle (e.g., 45°) which allows for easier loading and unloading of MP 100 by helping to guide MP 100 into and out of a trailer. Rub rail 108 is preferably a ¼" plate raised above the decking 104 which helps to release MP 100 from forklift blades and to prevent freight from shifting. Rub rail 108 may further comprise cutouts 110 along a top or side of rub rails 108. Cutouts 110 can be used to secure freight to MP 100 with straps or webbing.

Frame 102 may also comprise a plurality of vertical posts 112 along its length. Engagement members on vertical posts 112 can be used to place modular decks as disclosed in U.S. patent application Ser. No. 15/798,597, filed Oct. 31, 2017. The vertical posts 112 can be secure to frame 102 using any known means, such as bolting or placement in cutouts/pockets.

Fixed guide rollers 114 are located on each end of the MP 100. Preferably, fixed guide rollers 114 are hardened plastic or metallic rollers which are affixed to frame 102 such that fixed guide rollers 114 can rotate freely with respect to frame 102 for movement of MP 100. For example, fixed guide rollers 114 may utilize a standard construction in which a cylindrical roller rotates about a central metal axel using a ball bearing connection. The metal axel can then be affixed to frame 102.

Both ends of MP 100 preferably comprise connector openings 116 which can be used to attach an actuating attachment to MP 100 for conveyance around a cross-dock. The size and/or shape of connector openings 116 can be modified depending upon the construction of the actuating attachment. An example of an actuating attachment compatible with MP 100 will be described later.

Figure 2:
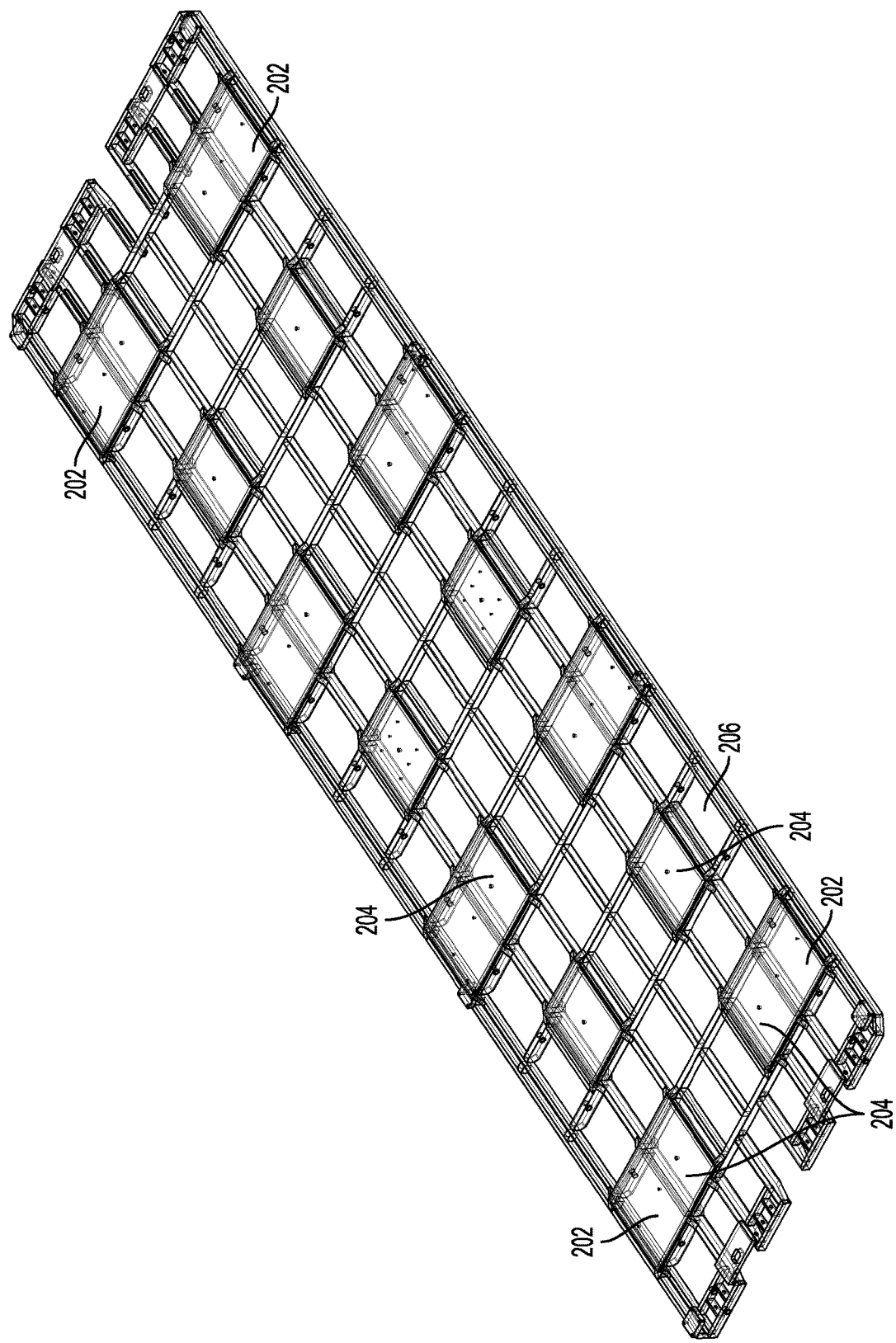
FIG. 2 depicts a view of the frame of the MP in isolation.

FIG. 2 depicts frame 102 in isolation. As shown, the frame 102, without decking 104, forms a grid which are covered by decking 104. However, certain sections of frame 102 are covered with permanent metal plates for securement of additional rollers to the underside of MP 100. Further, other metal plates are used to secure sections of mechanical lift brake assembly 106 as will be described later. Specifically, the four outer equally spaced sets of metal plates 202 are used to secure sections of mechanical lift brake assembly 106 to frame 102. The inner seven equally spaced sets of metal plates 204 are used to affix additional rollers or casters to the bottom of MP 100 as will be described later.

As already described, metal plates 202 and 204 are only utilized in certain sections of frame 102 when weight is of concern. However, for transport of heavier duty items, such as military or construction equipment, decking 104 may be replaced with metal plates and or metal mesh for additional strength when plywood would not be suitable.

Figure 3:
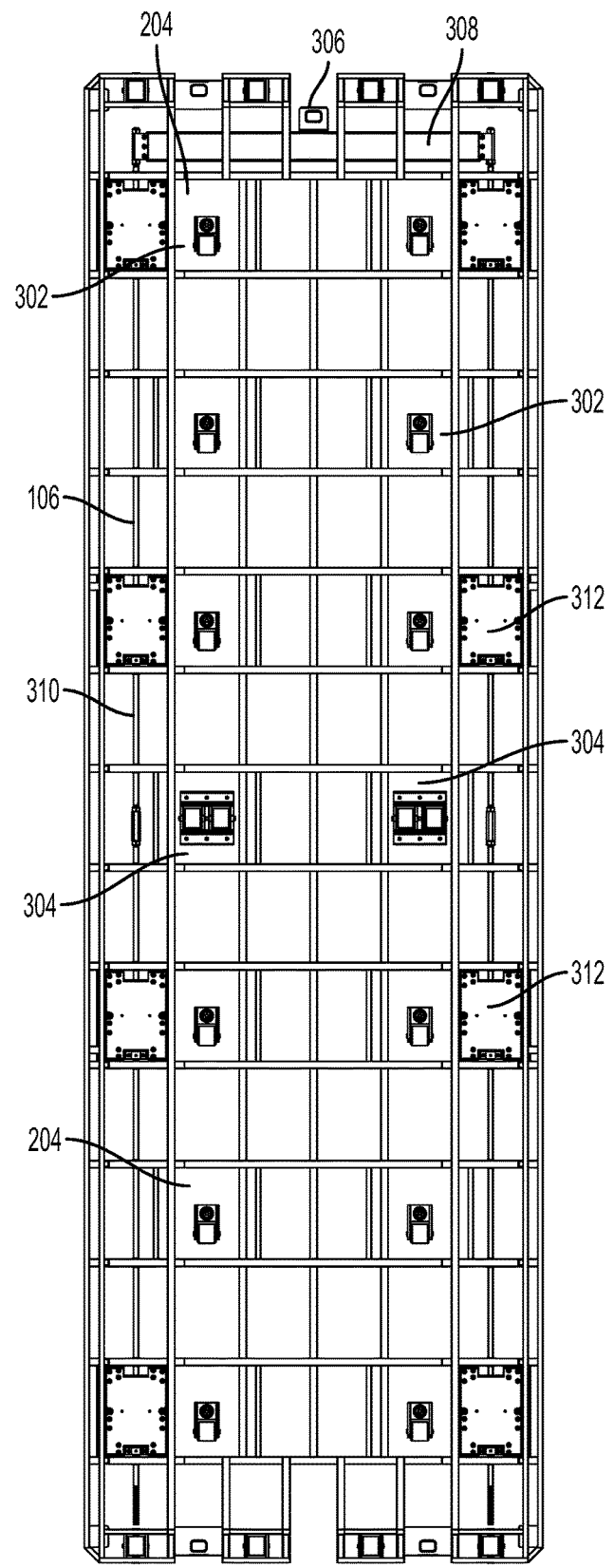
FIG. 3 depicts a bottom view of the MP of FIG. 1.

FIG. 3 depicts a bottom view of MP 100 to show additional components not visible in FIG. 1. A plurality of fixed swivel casters 302 and fixed pivot rollers 304 are attached to frame 102 via welding or bolting to metal plates 204. In the depicted embodiment, there are six sets of fixed swivel casters 302 and one set of fixed pivot rollers 304.

The fixed pivot rollers 304 are substantially identical in construction to fixed guide rollers 114 in that the rollers do not swivel and/or rotate with respect to frame 102 when MP 100 is being conveyed. In contrast, fixed swivel casters 302 rotate axially with respect to frame 102 to increase the maneuverability of MP 100. The quantity and/or location of fixed swivel casters 302 and fixed pivot rollers 304 can be adjusted based upon the requirements for MP 100. For example, if MP 100 requires a tight turning radius, fixed pivot rollers 304 (and fixed guide rollers 114) may be replaced with fixed swivel casters 302.

FIG. 3 also depicts the major components of mechanical lift brake assembly 106. As shown, mechanical lift brake assembly 106 generally comprises actuation drawbar 306, connection plate 308, lift brake shafts 310, and mechanical lift brakes 312. In the described embodiment, four sets of equally spaced mechanical lift brakes 312 are attached to frame 102 at metal plates 202 as will be described later. It should be obvious that the location, number, and spacing of the mechanical lift brakes 312 can be modified depending upon the dimensions and requirements of MP 100.

Figure 4:
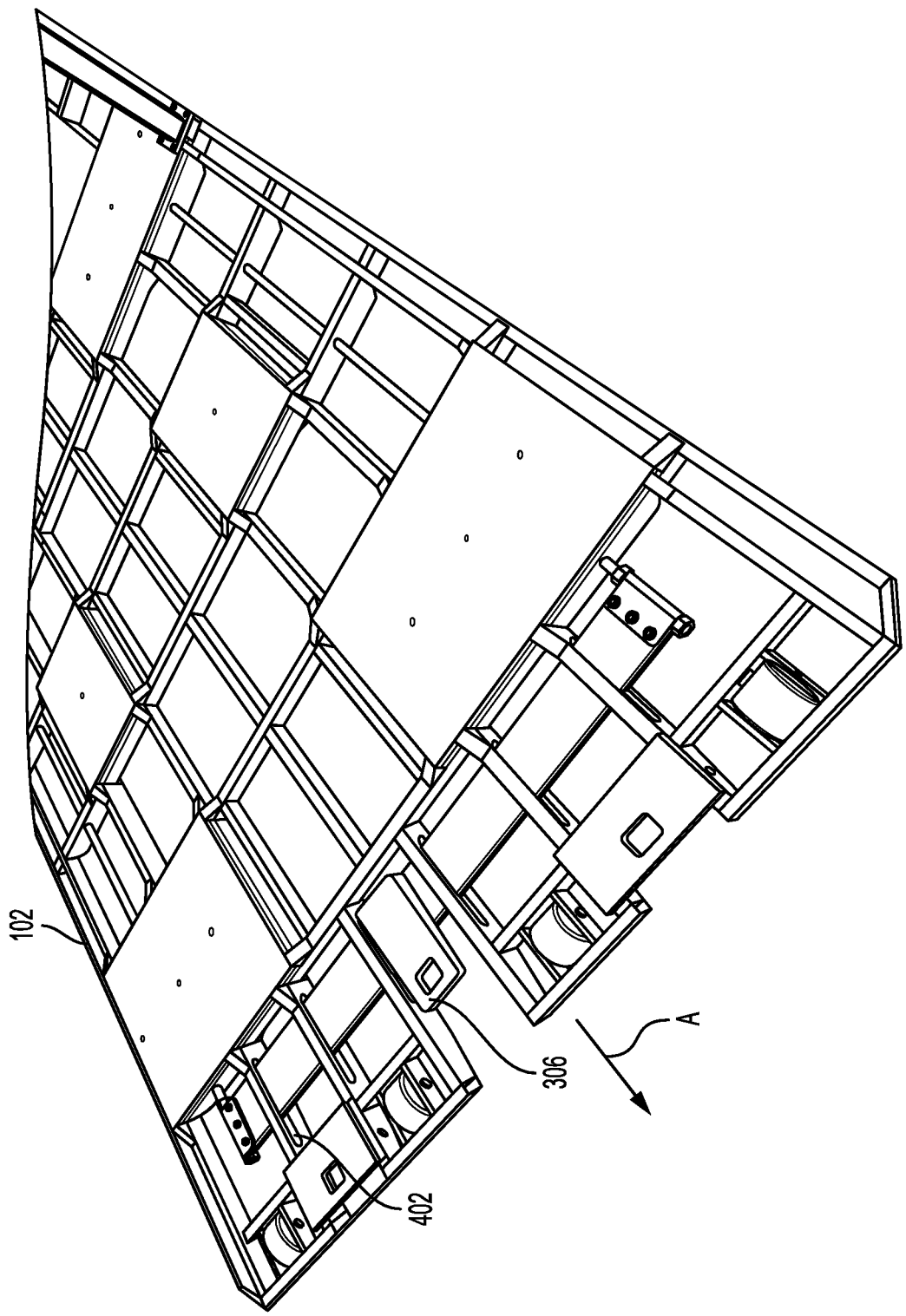
FIG. 4 depicts an enhanced view of the front of the MP of FIG. 1 with the decking removed.

Referring next to FIG. 4, depicted is an enhanced view of a front portion of frame 104 showing components of mechanical lift brake assembly 106. Specifically, this view shows that connection plate 308 extends through a plurality of slots 402 in frame 102. A width of each slot 402 is wider than a width of connection plate 308. Thus, when a lateral force is applied to actuation drawbar 306 in the direction of arrow A, connection plate 308 moves from the depicted position to an actuated position. In turn, connection plate 308 transfers the force applied to actuation drawbar 306 to both lift brake shafts 310 and mechanical lift brakes 312. The movement of connection plate 308 is limited by the width of slots 402.

Figure 5:
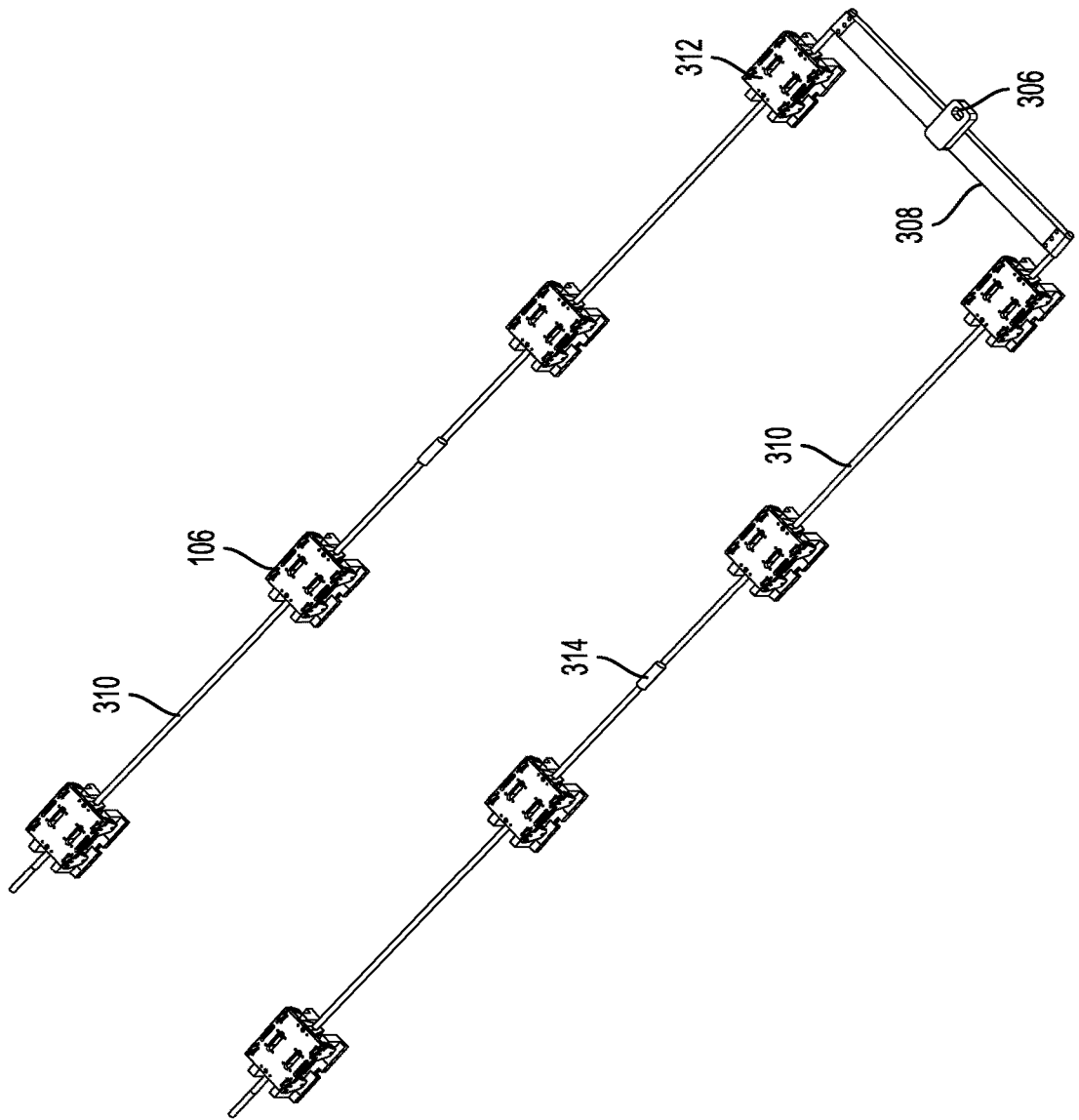
FIG. 5 depicts a view of the mechanical lift brake assembly in isolation.

FIG. 5 depicts mechanical lift brake assembly 106 in isolation. Each side of the mechanical lift brake assembly 106 comprises a set of lift brake shafts 310 that are connected to the mechanical lift brakes 312 in alteration. Further depicted is alignment mechanism 314 which has a wider diameter than that of lift brake shafts 310. Alignment mechanism 314 connects the front set of lift brake shafts 310 to the rear set of lift brake shafts 310 as depicted in FIG. 5.

Figure 6:
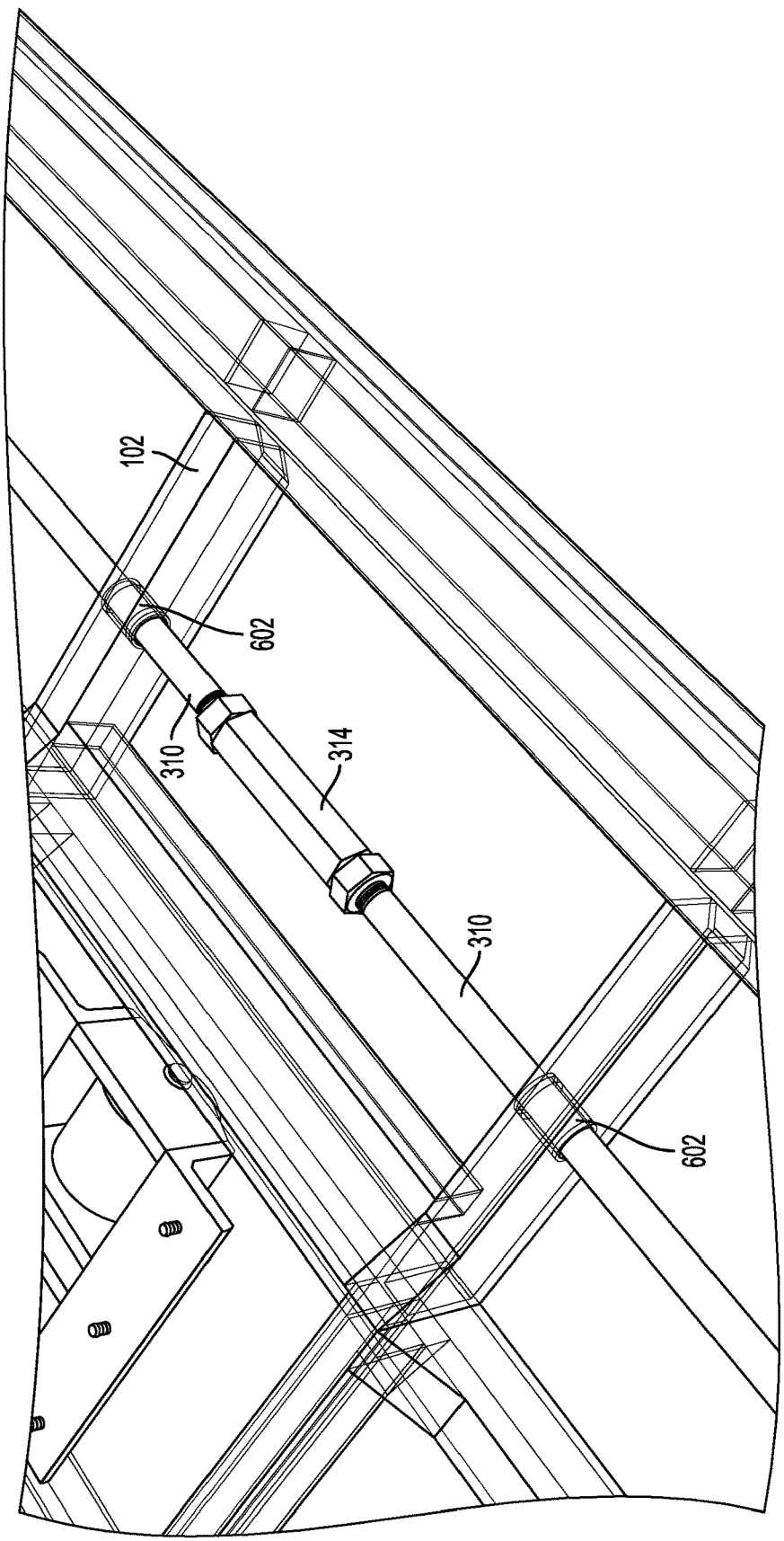
FIG. 6 depicts a view of the alignment mechanism used to align two lift brake shafts.

FIG. 6 depicts an enhanced view of a lift brake shaft 310 in frame 102. As shown, the lift brake shafts 310 extend through circular openings 602 in frame 102. Circular openings 602 allow the force applied to actuation drawbar 306 to be applied to each mechanical lift brake 312. The ends of two lift brake shafts 310 are connected together using alignment mechanism 314 through a threaded connection. Further, because alignment mechanism is larger in diameter than both lift brake shafts 310 and circular openings 602, alignment mechanism 314 also serves to limit the latter movement of lift brake shafts 310 because alignment mechanism 314 cannot pass through circular openings 602.

Figure 7:
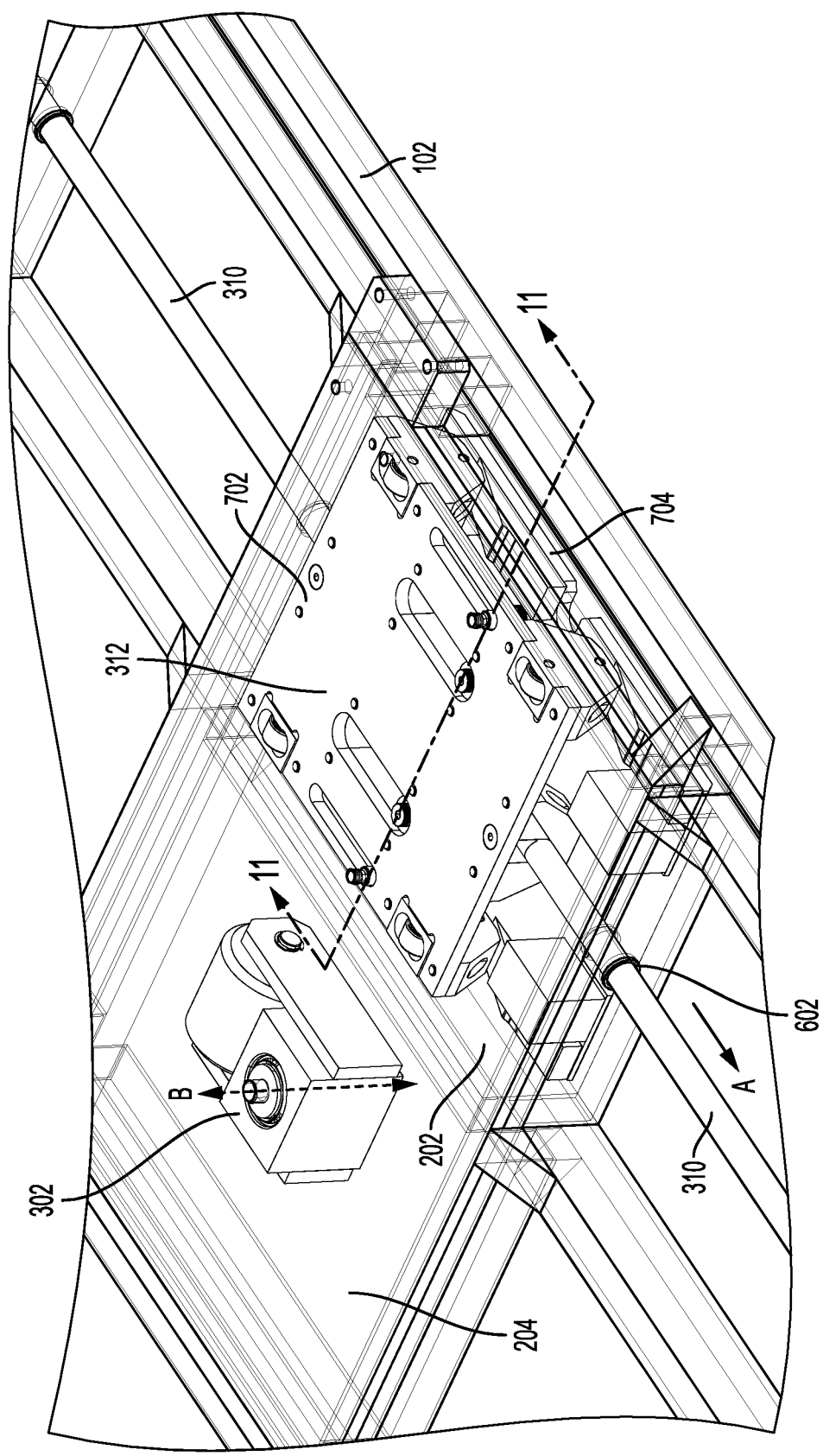
FIG. 7 depicts the placement of a singular mechanical lift brake within the frame of the MP.

FIG. 7 depicts the placement of a mechanical lift brake 312 within frame 102. Here frame 102 is shown in phantom for clarity. Also depicted is a fixed swivel caster 302 attached to the underside of a metal plate 204 via a bolted connection. Fixed swivel caster 302 is free to rotate axially with respect to frame 102 about axis B.

Mechanical lift brake 312 is formed from upper lift brake assembly 702 and lower lift brake assembly 704. As depicted, lower lift brake assembly 704 is slidably fitted within rectangular cross members of frame 102 (specifically within a portion of the grid) but is free to extend and retract along axis B. In contrast, upper lift brake assembly has a length less than that of lower lift brake assembly 704 and thus is movable with respect to lower lift brake assembly 704. As the force in direction A is applied to mechanical lift brake 312 through lift brake shaft 310, upper lift brake assembly 702 slides relative to lower lift brake assembly 704 and exerts a downward force on lower lift brake assembly 704, causing it to extend downward along axis B until it is even with a lower surface of fixed swivel casters 302 and fixed pivot rollers 304 or extends beyond them, lifting MP 100 off the ground and preventing MP 100 from moving. More specifics of the actuation of mechanical lift brake 312 will be described with reference to the following figures.

Figure 8:
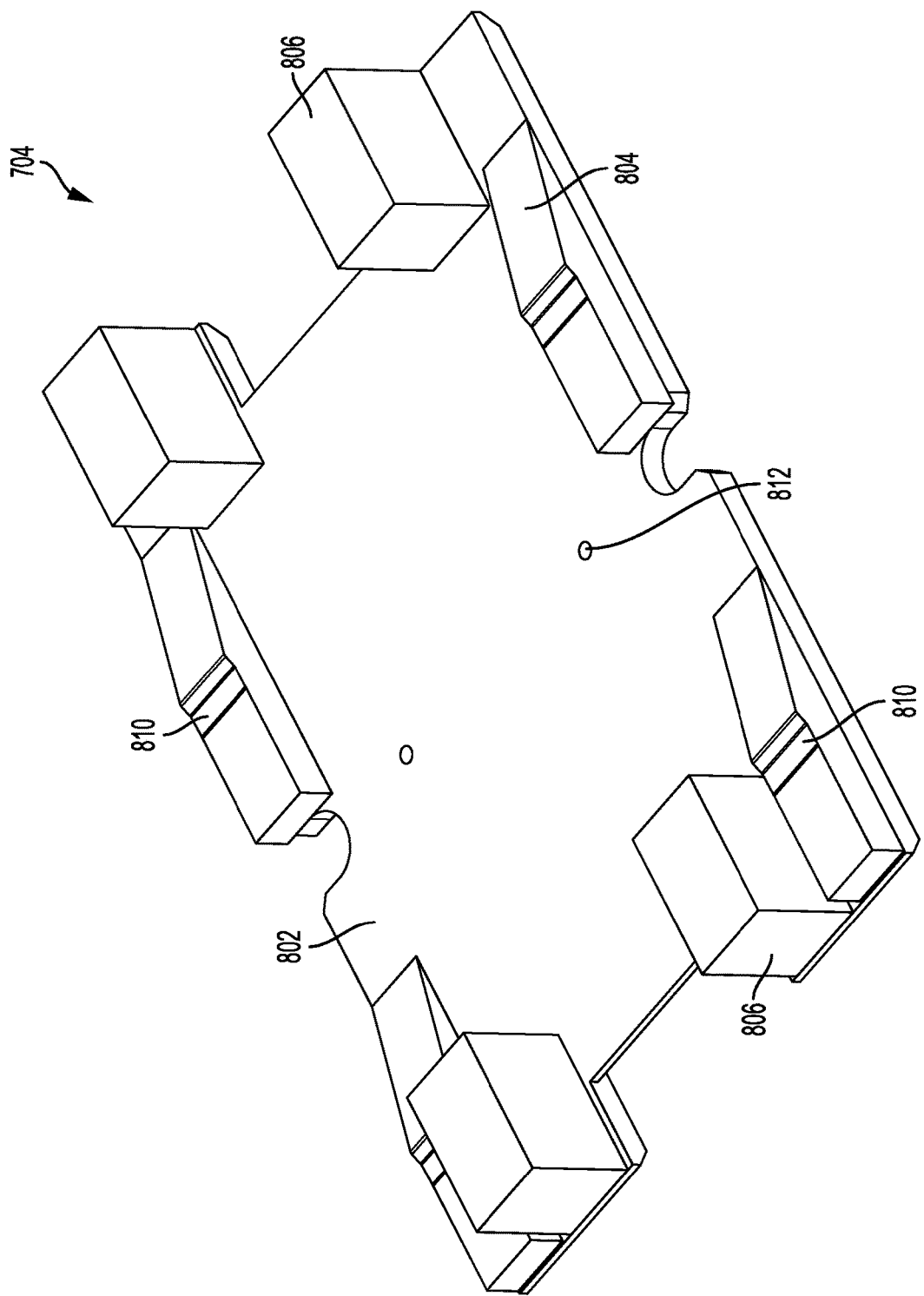
FIG. 8 depicts a perspective view of the lower lift brake assembly.

FIG. 8 depicts lower lift brake assembly 704 in isolation. Lower lift brake assembly 704 comprises base 802, ramps 804, and support blocks 806. Fastener holes 808 in base 802 are used to connect lower lift brake assembly 704 to upper lift brake assembly 702 as will be described later. The movement of upper lift brake assembly 702 along ramps 804 is what causes lower lift brake assembly 704 to move downward as already explained. Thus, a bottom of base 802 acts as the "brake" of mechanical lift brake assembly 106 in that it prevents MP 100 from movement. The bottom of base 802 may be metal or may be coated with a non-skid material such as a plastic or metallic tread.

The height of support blocks 806 prevents lower lift brake assembly 704 from exiting the cross-members of frame 102 and ensure smooth upward/downward movement of lower lift brake assembly 704 with respect to frame 12.

The ramps 804 each have a détente 810 in which the rollers (to be described later) from upper lift brake assembly 702 rest to maintain the mechanical lift brake assembly 106 in the fully actuated position during transport. That is because a force is required to be exerted on actuation drawbar 306 in order to move upper lift brake assembly 702 out of détentes 810.

Figure 9A:
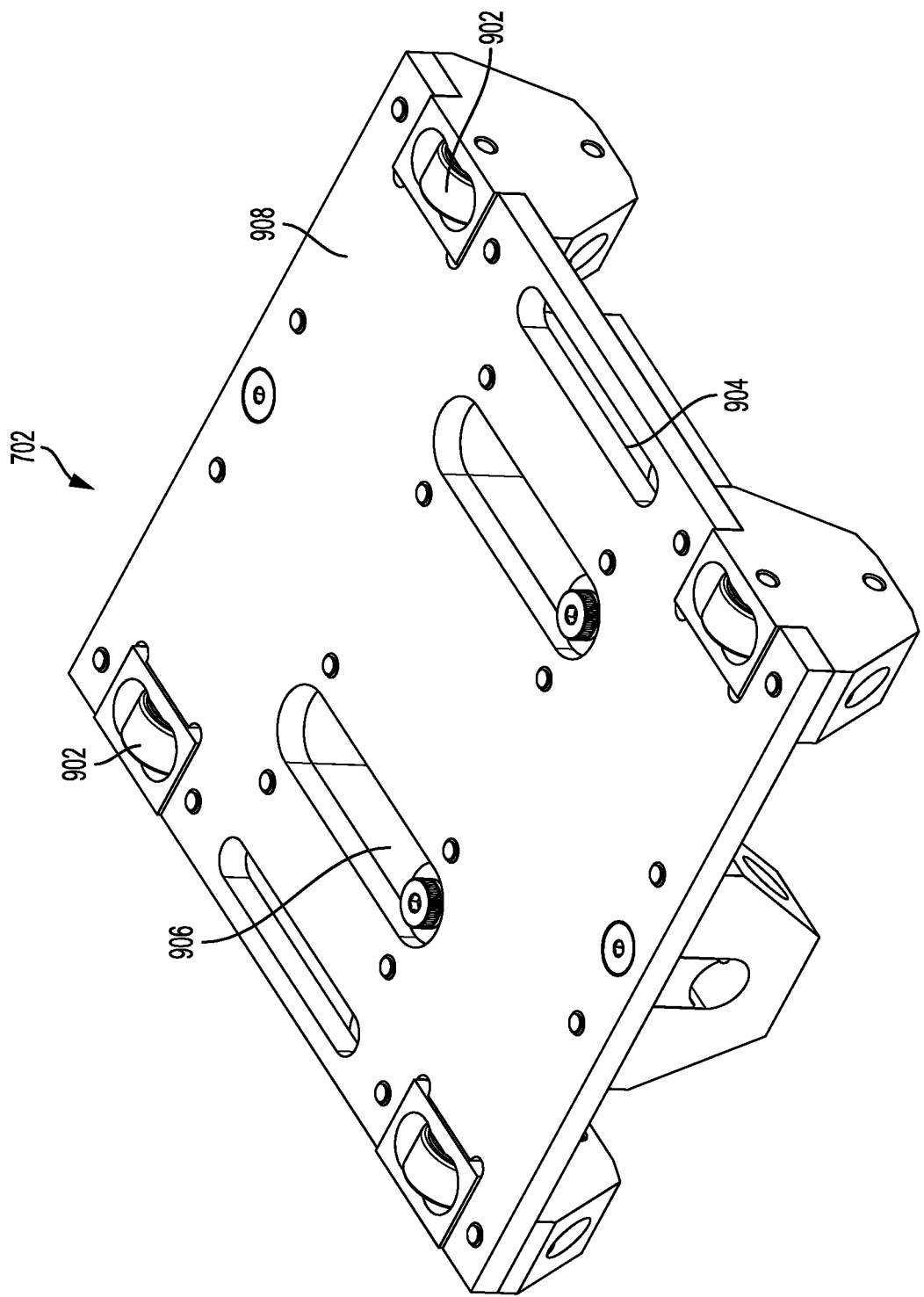
FIG. 9A depicts a perspective view of the top of the upper lift brake assembly.

FIG. 9A depicts a perspective view of the top of the upper lift brake assembly 702. The top of upper lift brake assembly 702 comprises upper rollers 902, floor guide slot 904, and spring guide slot 906 in base 908. The upper rollers 902 allow for the lateral movement of upper lift brake assembly 702 along the underside of metal plates 202.

Bolts 906, extending from fastener holes 206 formed in metal plates 202 through floor guide slot 904 slidably connect upper lift brake assembly 702 (and thus mechanical lift brakes 312) to frame 102. The connection between metal plate 202 and upper lift brake assembly 702 through floor guide slot 904 primarily serves to ensure predictable movement of upper rollers 902 along the lower surface of metal plates 202 as the force is exerted on actuation drawbar 306. The length of floor guide slot 904 also limits the amount of movement of upper lift brake assembly 702 with respect to frame 102.

Figure 9B:
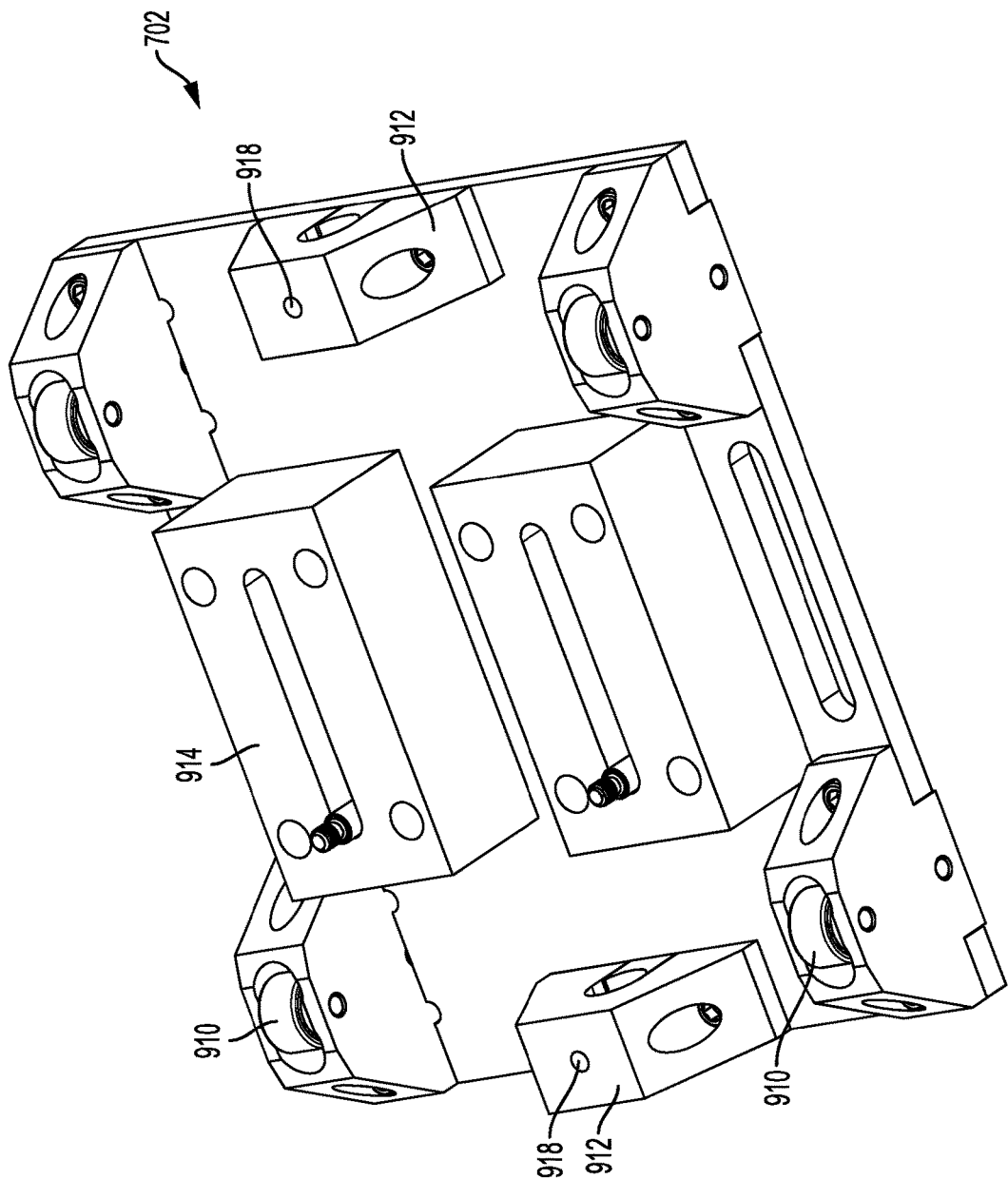
FIG. 9B depicts a perspective view of the bottom of the upper lift brake assembly.

FIG. 9B depicts a perspective view of the bottom of upper lift brake assembly 702. The bottom of upper lift brake assembly 702 comprises lower rollers 910, lift brake shaft openings 912, and spring guides 914. The lower rollers 910 roll along ramps 804 of lower lift brake assembly 704. Thus, as the lower rollers 910 roll up ramps 804 and enter détentes 810, each mechanical lift brake 312 expands as lower lift brake assembly 704 is deployed downward.

Figure 12:
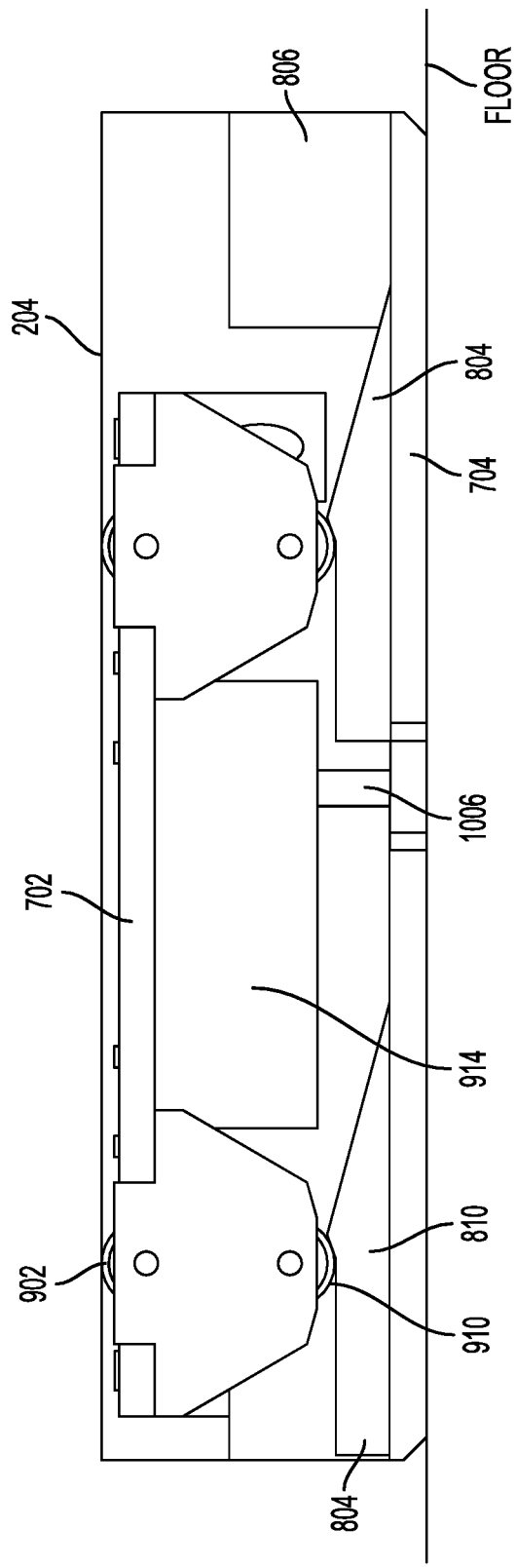
FIG. 12 depicts a side view of a mechanical lift brake after expansion.

A lift brake shaft 310 passes through lift brake shaft openings 912 as shown in FIG. 12, further serving to maintain upper lift brake assembly 702 secured to frame 102. Specifically, since upper lift brake assembly 702 is constrained in upward/downward movement by lift brake shafts 310, lower lift brake assembly 704 is forced away from upper lift brake assembly 702 as lower rollers 910 ascend ramps 804 as the force is applied to actuation drawbar 306. A set screw, placed through opening 918, either abuts the lift brake shaft 310 placed therethrough or enters a corresponding opening in lift brake shaft 310, thus causing movement of upper lift brake assembly 702 concurrent with the movement of lift brake shaft 310.

Figure 10:
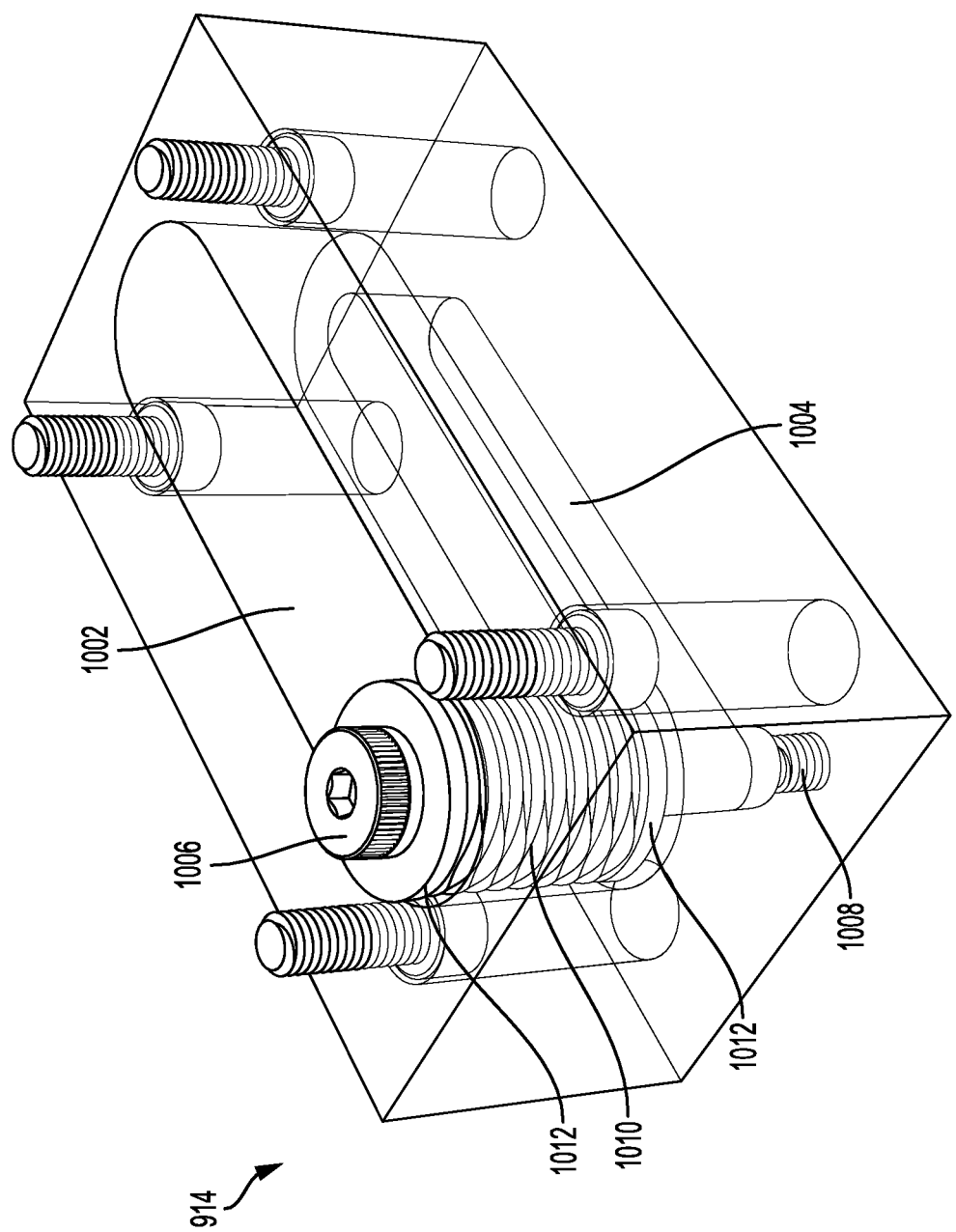
FIG. 10 depicts a view of a spring guide in isolation with the outer casing shown in phantom.

Spring guides 914 provide the connection between upper lift brake assembly 702 and lower lift brake assembly 704. For illustrative purposes FIG. 10 depicts a spring guide 914 in isolation with the outer portion of spring guide 914 shown in phantom. Each spring guide 914 comprises upper slot 1002 and lower slot 1004 having different widths. Specifically, the width of upper slot 1002 is greater than that of lower slot 1004. A bolt 1006 extends from upper slot 1002, through lower slot 1004, and terminates with threads 1008 which mate with threaded openings 812 in base 802. An upper portion of bolt 1006, located in upper slot 1002, is surrounded by spring 1010 confined between two washers 1012. The diameter of washers 1012 and springs 1010 are less than the width of upper slot 1002 but greater than the width of lower slot 1004. Thus, the combination of springs 1010 and washers 1012 prevents the separation of upper lift brake assembly 702 from lower lift brake assembly 704.

Further, as lower rollers 910 roll up ramps 804 and into détentes 810, bolt 1006 moves from a first end of upper slot 1002 to a second end of upper slot 1002. The gradual increase in separation between upper lift brake assembly 702 and lower lift brakes assembly 704 causes spring 1010 to become compressed. As lower rollers 910 reach détentes 810, springs 1010 exert an expansion force helping to maintain lower rollers 910 within détentes 810 (i.e., because springs 1010 have been compressed).

Figure 11:
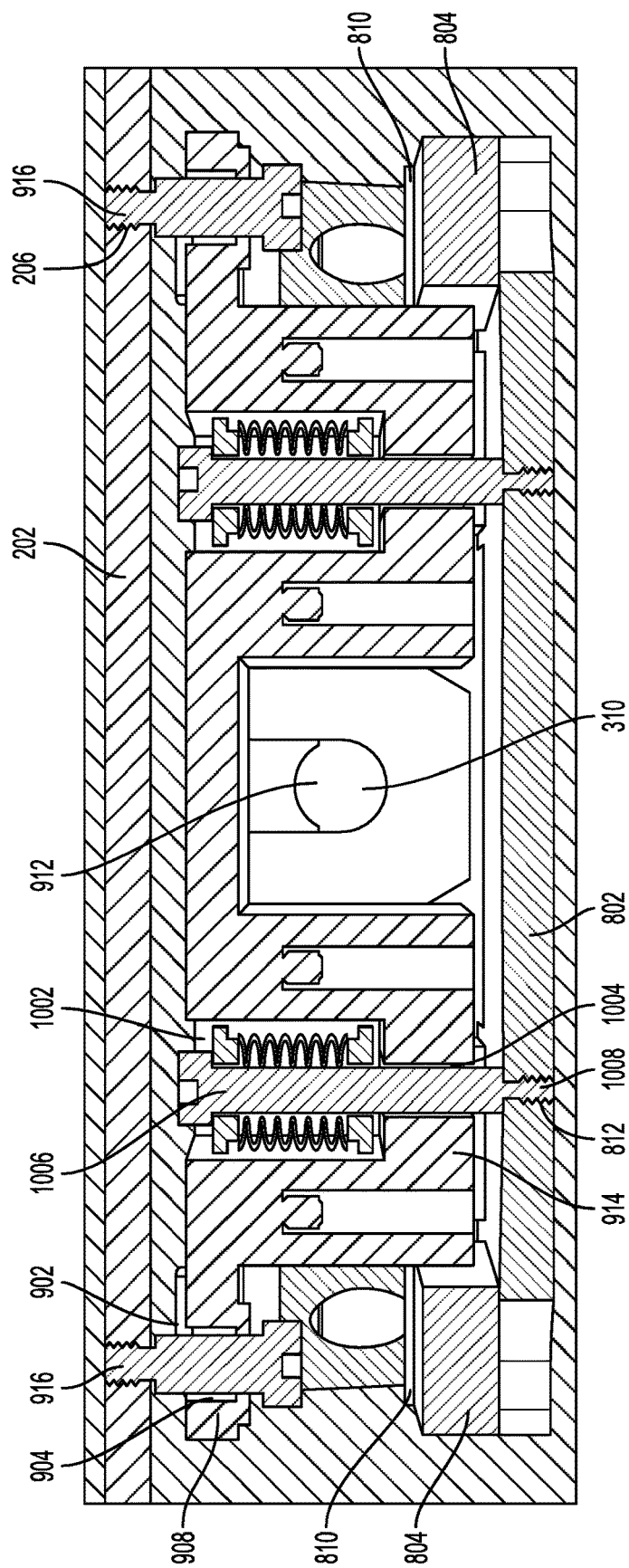
FIG. 11 depicts a cross sectional view taken along the dashed line of FIG. 7.

FIG. 11 depicts a cross-sectional view taken along the dashed line of FIG. 7. Specifically FIG. 11 depicts the connections between frame 102, upper lift brake assembly 702, and lower lift brake assembly 704. As shown, two bolts 916 extending through floor guide slot 904 in base 908 into fastener holes 206 in metal plates 202 couples upper lift brake assembly 702 to frame 102. The lift brake shaft 310 extending through lift brake shaft opening 912 further couples upper lift brake assembly 702 to frame 102.

Bolts 1006 extend from upper slot 1102, through lower slot 1004 and are threads 1008 are coupled to threaded openings 812 in base 802. Springs 1010 and washers 1012, surrounding the shaft of bolts 1006, prevent the disengagement of lower lift brakes assembly 704 from upper lift brake assembly 702. Also, as lower rollers 910 descend the incline of ramps 804, the compressive force stored in the spring lifts lower lift brake assembly 704 to its original position, allowing MP 100 to be conveyed again.

The view of mechanical lift brake 312 in FIG. 7 depicts the mechanical lift brake before actuation (i.e., before a force has been applied to actuation drawbar 306). FIG. 12 depicts a side view of mechanical lift brake 312 after the force has been applied to actuation drawbar 306. In this view, lower rollers 910 have rolled up ramps 804 into détentes 910. This causes the expansion of mechanical lift brake 312 and compression of springs 1010. As shown, the increased separation between upper lift brake assembly 702 and lower lift brake assembly 704 causes a downward movement of bolts 1006, causing springs 1010 to compress.

FIG. 12 also depicts how the expansion of mechanical lift brakes 312 causes MP 100 to be lifted off the ground. This occurs because lower lift brake assembly 704 extends downward past the bottom surface of fixed guide rollers 114, fixed swivel casters 302, and fixed pivot rollers 304, preventing their use in the movement of MP 100.

Figure 13:
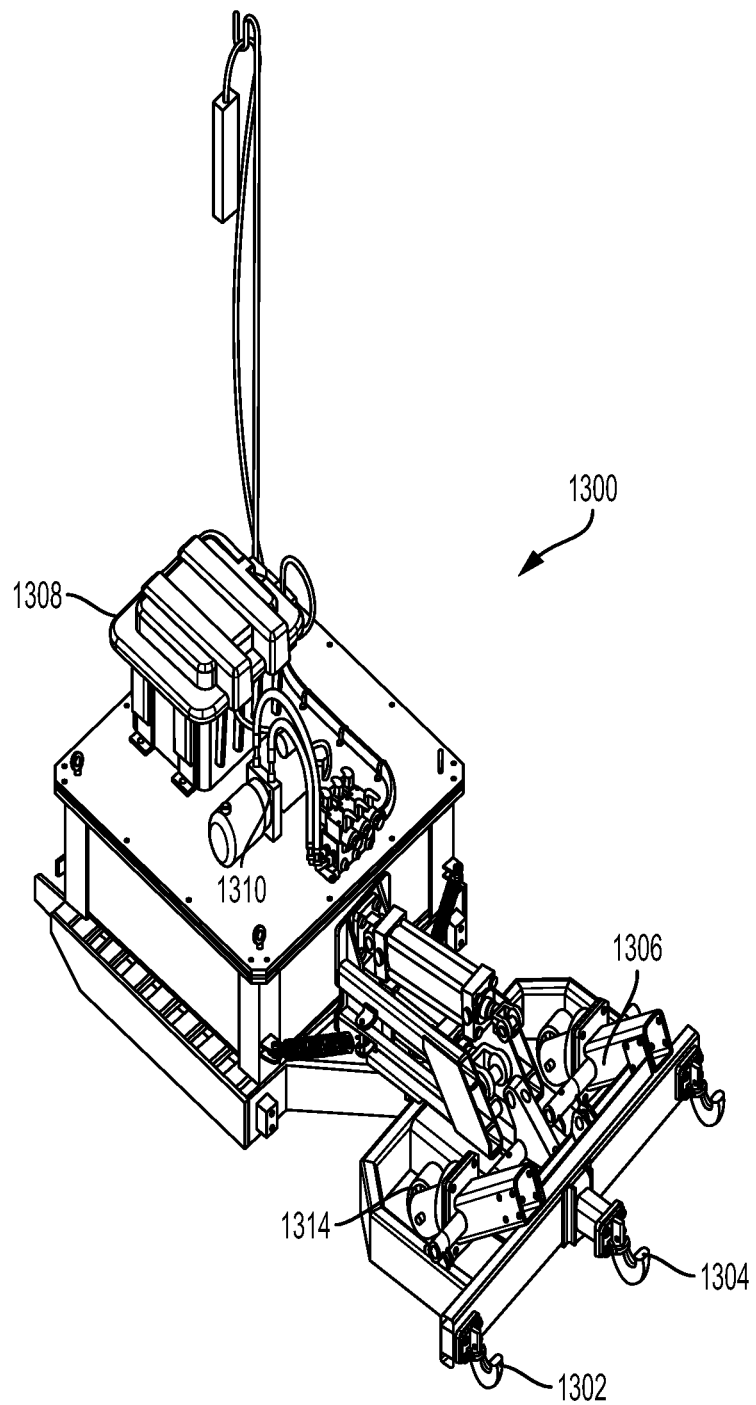
FIGS. 13 and 14 depict perspective views of a MP forklift attachment.

FIG. 13 depicts a perspective view of the MP forklift attachment 1300 which can be used to actuate mechanical lift brakes 312. The MP forklift attachment 1300 comprises fixed pintle hooks 1302, actuation pintle hook assembly 1304, caster lift assembly 1306, battery and battery housing 1308, hydraulic pump assembly 1310, and control pendant 1312. The MP forklift attachment 1300 can be utilized to (a) move mechanical lift brake assembly 106 between engaged and disengaged positions and (b) decrease the turning radius and increase the maneuverability of MP 100 during conveyance.

The MP forklift attachment 1300 connects to the MP 100 via connector openings 116 using by utilizing the fixed pintle hooks 1302. This connection allows the forklift driver to convey MP 100 in/out of a trailer and in a warehouse utilizing the MP forklift attachment 1300.

The actuation pintle hook assembly 1304 is utilized to engage and disengage mechanic lift brake assembly 106 by connecting to actuation drawbar 306. The actuation pintle hook assembly 1304 is controlled by the battery and battery housing 1308, the hydraulic pump assembly 1310, and the control pendant 1312. Hydraulic pump assembly 1310 actuates a hydraulic cylinder to push and pull the actuation drawbar 306 using actuation pintle hook assembly 1304 to lift and lower MP 100.

The caster lift assembly 1306 is utilized to raise and lower the end of the MP 100 to allow for easier conveyance in a warehouse. The caster lift assembly 1306 is controlled by the battery and battery housing 1308, the hydraulic pump assembly 1310, and the control pendant 1312. The caster lift assembly 1306 is engaged and disengaged by using a hydraulic cylinder to rotate the casters 1314 up and down.

Figure 14:
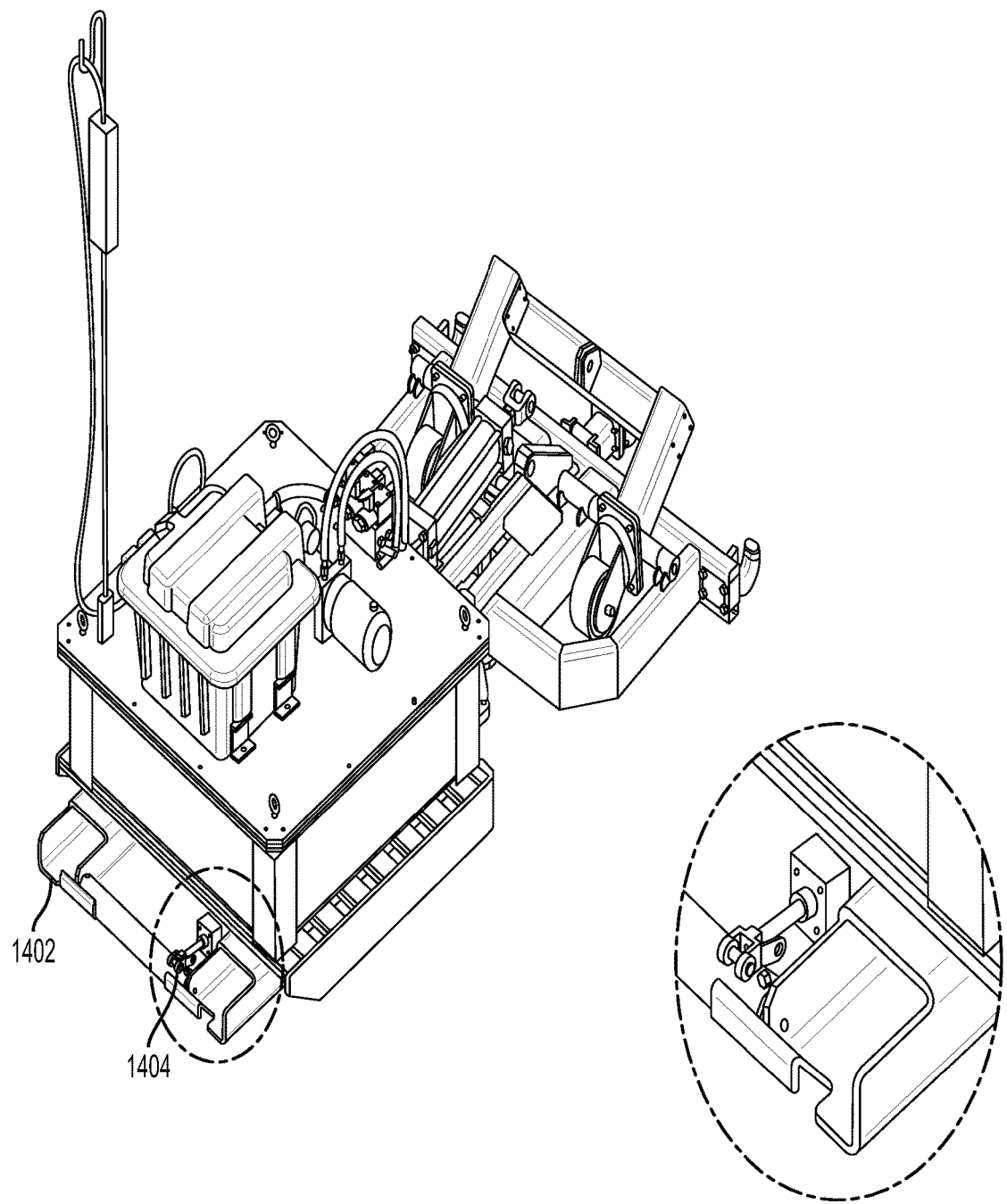

FIG. 14 depicts a rear perspective view of the rear of the MP forklift attachment 1300. The rear of the MP forklift attachment 1300 comprises forklift tine pockets 1402 and a forklift tine locking mechanism 1404. The forklift tine pockets 1402 are designed to allow standard forklift tines to be inserted into the pockets for attaching the MP forklift attachment 1300 to the forklift. The forklift tine locking mechanism 1404 is controlled by the battery and battery housing 1308, hydraulic pump assembly 1310, and the control pendant 1312. To lock the forklift tines to the MP forklift attachment 1300, a hydraulic cylinder rotates a plate 90 degrees to prevent the forklift tine from exiting the MP forklift attachment 1300 during use.

Figure 16:
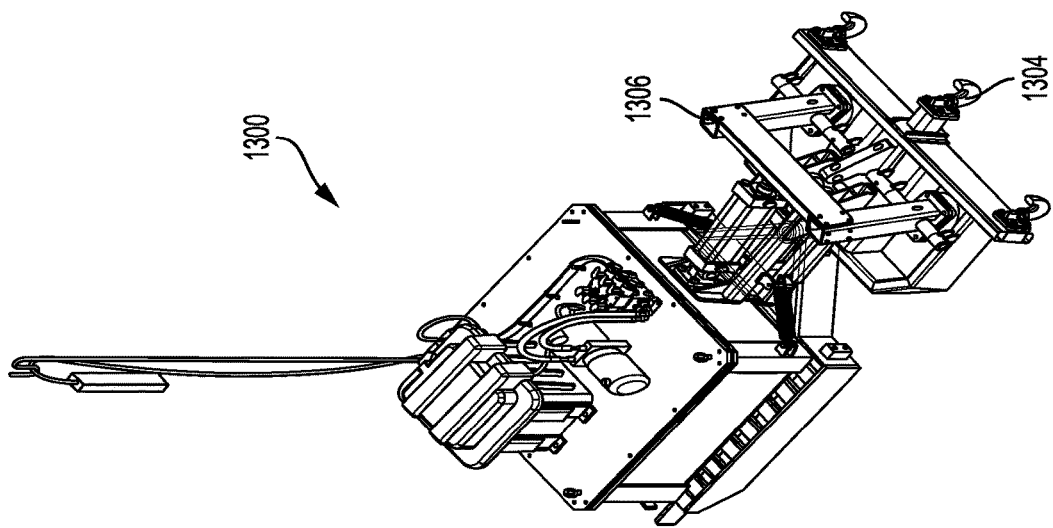
FIG. 16 depicts the actuation pintle hook assembly and caster lift assembly of the MP forklift attachment in an engaged position.
Figure 15:
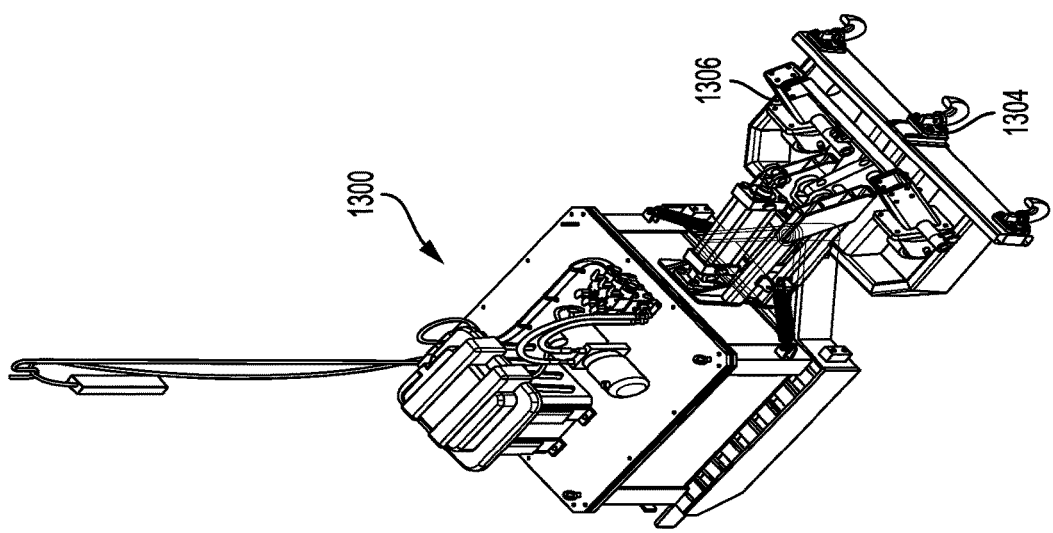
FIG. 15 depicts the actuation pintle hook assembly and caster lift assembly of the MP forklift attachment in a retracted position.

FIG. 15 depicts a perspective view of the MP forklift attachment 1300 with the caster lift assembly 1306 and actuation pintle hook assembly 1304 retracted. FIG. 16 depicts a perspective view of MP forklift attachment 1300 with the caster lift assembly 1306 and actuation pintle hook assembly 1304 extended.

Figure 17:
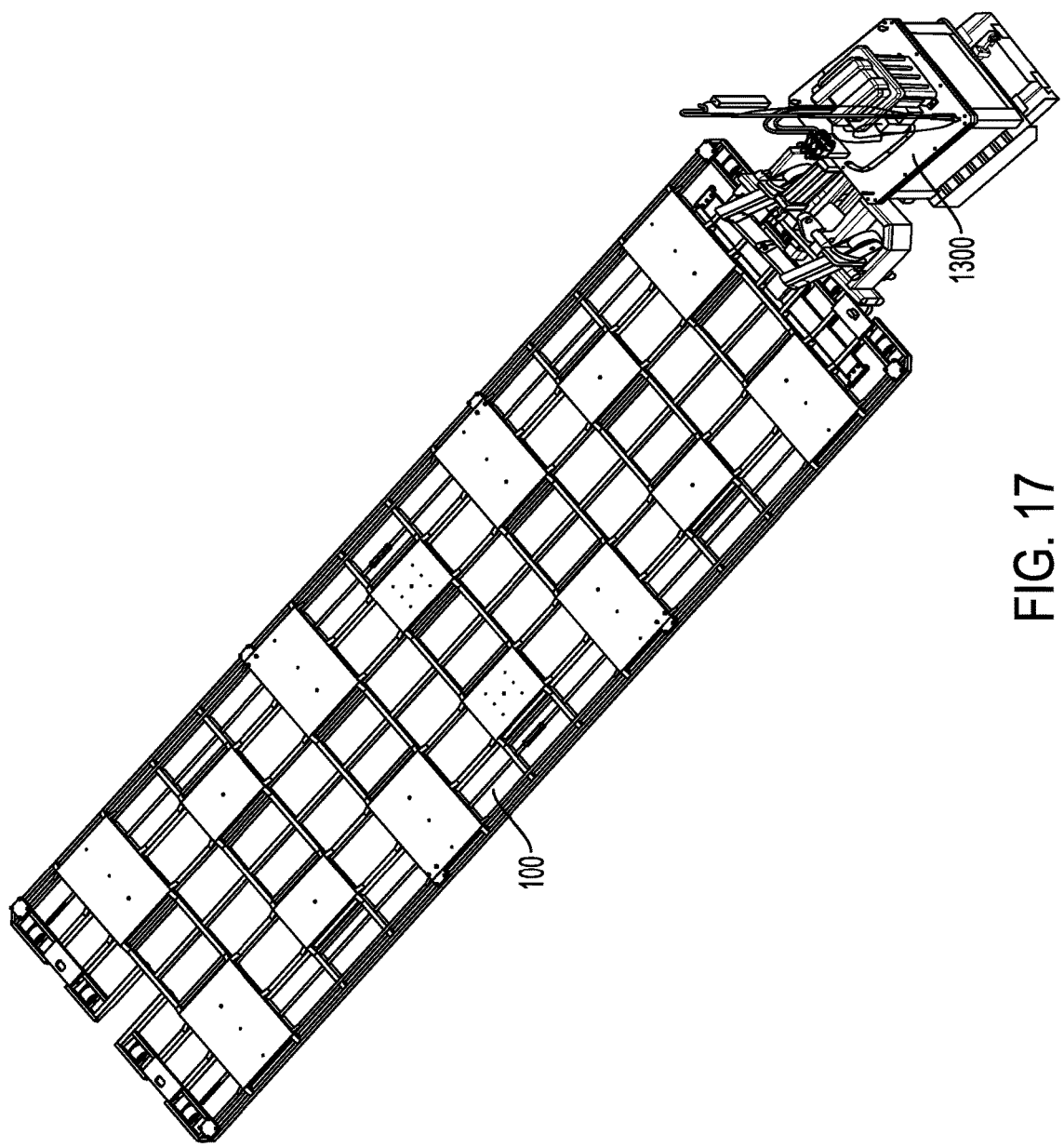
FIG. 17 depicts the MP forklift attachment attached to the MP for conveyance.

FIG. 17 depicts a perspective view of the MP 100 and the forklift attachment 1300 attached for conveyance. The fixed pintle hooks 1302 and actuation pintle hook assembly 1304 are connected to the connector openings 116 and actuation drawbar 306 to allow for MP forklift attachment 1300 to convey the MP 100.

Figure 18:
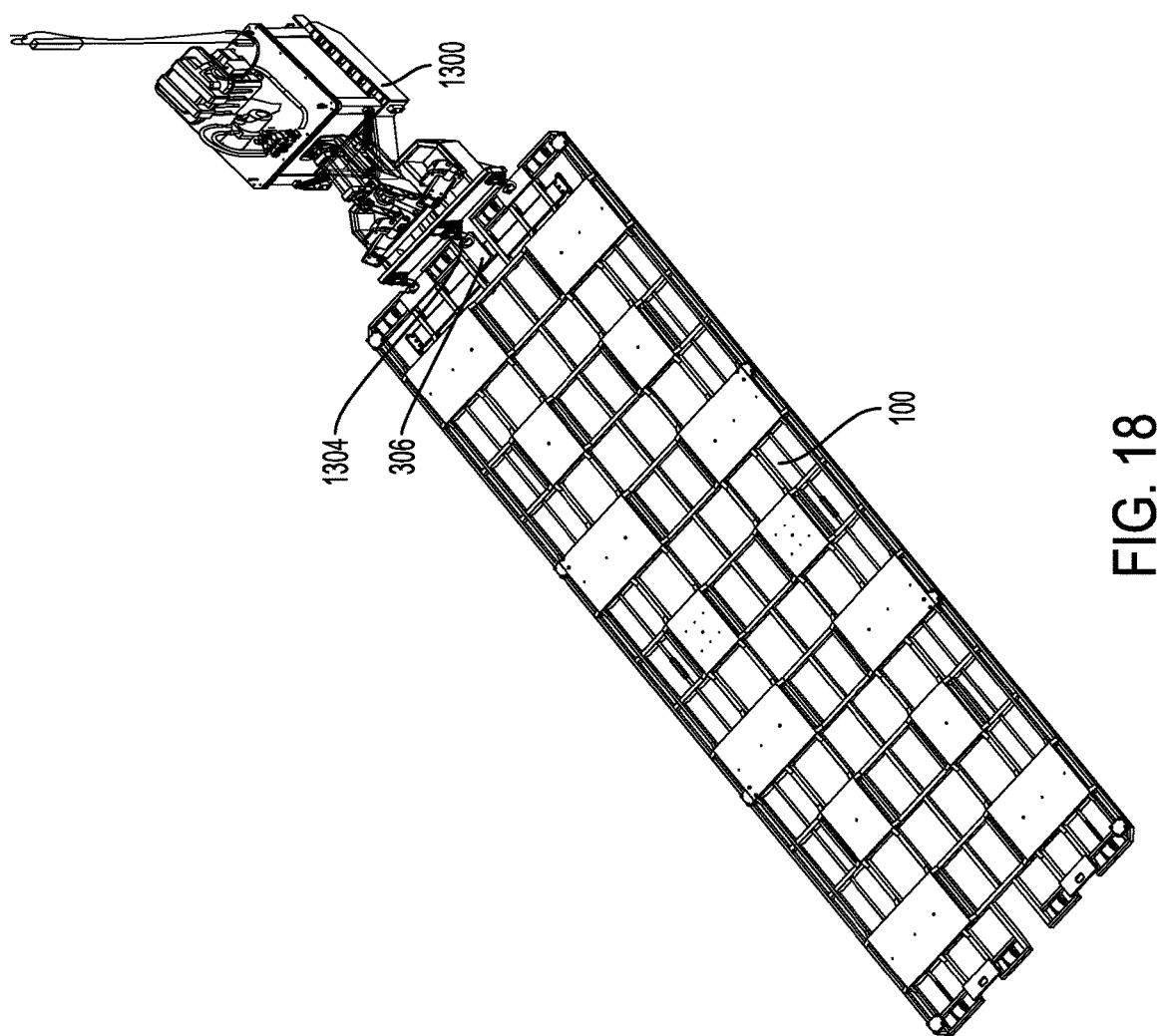
FIG. 18 depicts the MP forklift attachment being used to actuate the mechanical lift brake assembly.

FIG. 18 depicts a perspective view of the MP 100 and MP forklift attachment 1300 attached with the actuation drawbar 306 extended to raise the MP 100 using mechanical lift brake assembly 106. The MP 100 is extended by retracting the actuation pintle hook assembly 1304. The MP 100 is placed in this position to prevent moving during transport over-the-road and during use in a warehouse.

It should be obvious that MP forklift attachment is only one possible mechanism that may be utilized to engage/disengage mechanical lift brake assembly 106. Any device capable of exerting a pushing/pulling force on actuation drawbar 306 (relative to MP 100) would be compatible with the present invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The invention claimed is:
1. A movable platform comprising:
a frame;
a plurality of wheels coupled to the frame; and
a mechanical lift brake assembly, wherein the mechanical lift brake assembly comprises:
 a drawbar;
 a connection plate coupled to the drawbar;
 wherein the connection plate extends in a direction perpendicular to a first central longitudinal axis of the drawbar; and
 a plurality of lift assemblies coupled to the connection plate,
 wherein each lift assembly has a second central longitudinal axis extending in the same direction as the first central longitudinal axis;
 wherein each lift assembly comprises:
  a plurality of lift brakes; and a plurality of lift brake shafts coupled to at least one lift brake of the plurality of lift brakes;

wherein each lift brake comprises:

a lower lift brake assembly comprising a plurality of ramp guides on a top surface of the lower lift brake assembly; and an upper lift brake assembly slidably coupled to the lower lift brake assembly, wherein a bottom surface of the upper lift brake assembly comprises a plurality of rollers;

wherein a force exerted on the drawbar in the direction of the first central longitudinal axis causes expansion of the plurality of lift brakes through movement of the rollers along inclined ramps of the ramp guides.

2. The movable platform according to claim 1, wherein the connection plate extends through a plurality of slots in cross-members of the frame, wherein a width of the slots is greater than a width of the connection plate.

3. The movable platform according to claim 1, wherein a first end of the drawbar comprises an attachment point, and wherein the force exerted on the drawbar is applied using the attachment point.

4. The movable platform according to claim 3, wherein the attachment point is located exterior to the frame.

5. The movable platform according to claim 3, wherein the attachment point is a vertical hook or a lunette eye.

6. The movable platform according to claim 3, wherein the force exerted on the drawbar is applied by a hydraulically actuated hook coupled an actuating attachment.

7. The movable platform according to claim 1, wherein a length of each lower lift brake assembly is greater than a length of the upper lift brake assembly.

8. The movable platform according to claim 1, wherein a bottom surface of each lower lift brake assembly comprises a metal or plastic tread.

9. The movable platform according to claim 1, wherein each ramp guide comprises:

a détente located immediately adjacent a highest point of the inclined ramp of each ramp guide.

10. The movable platform according to claim 9, wherein each upper lift brake assembly comprises:

a plurality of top rollers coupled to a top surface.

11. The movable platform according to claim 10, wherein the frame comprises a metal plate located above each lift brake, and wherein the plurality of top rollers are in contact with a bottom surface of at least one metal plate of the plurality of metal plates.

12. The movable platform according to claim 8, wherein the upper lift brake assembly is coupled the lower lift brake assembly using a plurality of spring guides.

13. The movable platform according to claim 12, wherein each spring guide of the plurality of spring guides comprises:

a first slot;

a second slot;

a bolt extending through the first slot and second slot, wherein the bolt is coupled to a base of the lower lift brake assembly; and a spring surrounding a shaft of the bolt, wherein a diameter of the spring is greater than a width of the second slot but less than a width of the first slot.

14. The movable platform according to claim 13, wherein the expansion of the lift brakes causes a compression of the springs of the spring guides.

15. The movable platform according to claim 1, wherein the upper lift brake assembly comprises;

a plurality of lift brake shaft connectors for accommodating a lift brake shaft placed through the plurality of lift brake shaft openings; and a plurality of bolts for coupling the plurality of lift brake shaft connectors to the lift brake shaft placed therethrough such that movement of the lift brake shaft causes concurrent movement of the upper lift brake assembly.

* * * * *